United States Patent [19]

Stark, Jr.

[11] Patent Number: 4,481,335

[45] Date of Patent: Nov. 6, 1984

[54] RUBBER COMPOSITIONS AND METHOD

[76] Inventor: Fred J. Stark, Jr., 4507 Willow Oak La., Minnetonka, Minn. 55343

[21] Appl. No.: 291,386

[22] Filed: Aug. 10, 1981

[51] Int. Cl.$^3$ .......................... C08J 11/04; C08L 9/00; C08L 9/02; C08L 9/06

[52] U.S. Cl. ..................................... 525/261; 264/37; 264/235.8; 264/331.13; 525/263; 525/290; 525/313

[58] Field of Search ................. 260/2.3; 525/193, 236, 525/244, 263, 261, 290, 313; 264/37; 521/41, 44.5

[56] References Cited

U.S. PATENT DOCUMENTS

| | | | |
|---|---|---|---|
| 3,281,389 | 10/1965 | Hirshfield | 525/236 |
| 3,489,710 | 1/1970 | Bonotto et al. | 260/2.3 |
| 3,726,944 | 4/1973 | Bennett et al. | 260/2.3 |
| 4,101,463 | 7/1978 | Morgan et al. | 260/2.3 |
| 4,125,578 | 11/1978 | Sear | 260/2.3 |
| 4,244,841 | 1/1981 | Frankland | 260/2.3 |
| 4,257,925 | 3/1981 | Freeguard | 260/2.3 |
| 4,304,885 | 12/1981 | Omori et al. | 525/236 |

*Primary Examiner*—Allan Lieberman
*Attorney, Agent, or Firm*—James R. Haller

[57] ABSTRACT

A rubber molding composition comprising cured rubber scrap (as from automobile tires), a liquid, sulfur-curable polymeric binder, and a curing agent for the polymeric binder. The composition employs from about one to about five parts by weight of the polymeric binder per 100 parts by weight of the scrap rubber. The thus treated rubber scrap may be used in large proportions as a filler or extender for uncured rubbers.

18 Claims, No Drawings

RUBBER COMPOSITIONS AND METHOD

BACKGROUND OF THE INVENTION

Enormous quantities of cured rubber articles, such as rubber tires, are discarded yearly. The biodegradability of such articles is poor, and the articles themselves are, for the most part, either left as unsightly litter or are burned.

Attempts have been made to reuse cured rubber articles, but for the most part, such attempts do not appear to have been commercially successful and such articles continue to pose a disposal problem.

DESCRIPTION OF THE PRIOR ART

Various solutions have been proposed for utilizing cured rubber scrap. One such method uses large quantities of tall oil to adhere scrap rubber particles into a useful mass. Acetta et al, *Upgrading of Scrap Rubber Powder by Vulcanization Without New Rubber,* Rubber Chemistry and Technology 54:302–310 (1981) reports the vulcanization of rubber scrap using only sulfur or dimorpholine disulfide as a vulcanizing agent. Small amounts of scrap rubber may be added to virgin rubber as a filler. Scrap rubber has been also used as an additive for asphalt.

It would be desirable to utilize scrap rubber as a main or primary ingredient of a molding composition for the manufacture of rubber articles. Because of the cost of grinding scrap rubber articles and of further compounding, however, the use of significant quantities of more expensive materials should be avoided so that the compounded material may be pricecompetitive with virgin rubber. Of course, the physical properties of the compounded scrap rubber articles must at least approach the properties of virgin cured rubber.

SUMMARY OF THE INVENTION

The present invention relates to a scrap composition suitable for being molded into strong, rubber-like articles or for addition to other materials as a filler or extender. The invention also relates to a method for preparing the composition, and for preparing products therefrom.

The composition, briefly, comprises a homogenous blend of about 100 parts by weight of cured rubber particles, from about 1 to about 5 parts by weight of a liquid, ethylenically unsaturated, sulfurcurable polymeric binder soluble in hexane or benzene or a combination thereof, the binder having a viscosity at 280° F. of not greater than about one million centipoises, and a curing agent, in an effective quantity, for the polymeric binder. The curing agent may be substantially any of the curing agents commonly used for curing the polymeric binder but preferably is elemental sulfur or a compound which is a sulfur donor.

The blended composition, in the form of a dry, substantially free-flowing particulate mass, may be charged to a compression mold and molded under heat and pressure into useful articles such as rubber-like slabs for shoe soles, floor mats and the like. If desired, the composition may be used as an extender or filler for such rubbers as natural rubber, SBR, neoprene rubber, butyl rubber, nitrile rubber, and ethylene-propylene diene rubber.

DESCRIPTION OF THE PREFERRED EMBODIMENT

The cured rubber particles used in the invention are of natural or synthetic rubber or a combination thereof which has been substantially fully cured, as in the manufacture of automobile tires. Automobile tires themselves constitute a main source of cured rubber particles useful in the invention. Synthetic rubbers include such well-known rubbers as SBR, neoprene and nitrile rubbers, butyl rubbers and ethylene-propylene diene rubbers. The particles may be of substantially any reasonable size, and satisfactory results have been achieved with particles called "buffings" in the tire retread industry and having major dimensions of up to an inch or more, such particles normally existing as strips of rubber resulting from the skiving of retreaded rubber tires. The particles may range down to 300 mesh (U.S. Sieve Series) or finer in size. From an economic standpoint, it is desired that the particles fall generally within the range of about 20–30 mesh, but much larger and smaller particles may be tolerated as well. The particles may contain fillers such as tire cord material, carbon black and the like and are desirably reasonably free of grease, dirt or other contaminents, although considerable contamination is readily tolerated in the invention. Rubber tires can readily be ground up by cryogenic processes in which the rubber is cooled in liquid nitrogen or the like and then is pulverized. Other processes involve mechanical grinding of rubber articles. The shape of ground rubber particles appears to have little significance in the invention. Foam rubber particles can be employed in the invention as well.

The polymeric binder is a liquid having a viscosity at 280° F. of not greater than about one million cp. Preferably, the binder exhibits a viscosity at 150° F. of less than about 50,000 cp. The binder is characterized by ethylenic unsaturations; that is, it should have a minimum of about 3 mole percent unsaturation and desirably at least about 10 mole percent unsaturation. The liquid polymeric binder is soluble in hexane or benzene or combinations thereof to the extent of at least 10 grams of polymeric binder per one hundred ml. of solvent at room temperature. As explained more fully below, the polymeric binder is believed itself to be at least a poor solvent for the scrap rubber with which it is blended. If a small piece of rubber scrap is thinly coated with a polymeric binder of the invention and is then heated for ten minutes at 105° F., the surface of the rubber piece will soften and can be rubbed away by the fingers. This feature is particularly striking when the scrap rubber piece is carbon-filled; the removal of a surface layer of the piece leaves a dark stain on the fingers.

The polymeric binder of the invention is sulfur-curable to form a strong, solid article; that is, the cured article is neither a friable solid nor a weak gel. The ability of a candidate binder to be thus cured may be tested by uniformly mixing together equal parts of the binder and sulfur, discharging the mixture onto a smooth, steel plate, and heating the plate bearing the mixture for 30 minutes at 310° F. The resultant patty should be solid and strong, as contrasted with a weak, brittle material or a soft, stringy gel.

Of the polymeric binders useful in the invention, homopolymers and copolymers of 1,4-butadiene and substituted butadienes are preferred, and particularly copolymers of 1,4-butadiene and styrene have given excellent results. Such polymers, their methods of preparation and properties are known, and reference is made to Whitby, et al, *Synthetic Rubber,* John Wiley & Sons, New York, 1954 for an excellent treatment of such polymers. For the most part, such polymeric binders are products of emulsion or solution polymerization using known techniques. Such polymers generally have molecular weights not greater than about one million, preferably in the range of from about 1000 to about 100,000, and most preferably 1000 to about 50,000. Of the styrene-butadiene copolymers, the polymers having about 20–60% bound styrene are preferred. Such polymeric binders for the most part exhibit carbon backbones, often with some unsaturation. Particularly preferred polymeric binders are typified as follows:

Copolymers of Styrene and 1,4-Butadiene (in which the butadien mer units are primarily 1,4 or 1,2 or mixtures thereof);

Copolymers of Styrene and Isoprene;

Butadiene homopolymers (polymers that are primarily 1,4-polybutadiene, 1,2-polybutadiene and mixtures thereof, as available under the tradename "Ricon" from Colorado Chemical Specialties, Inc.;

Polyisoprenes (synthetic, or arising from depolymerization of natural rubber, as available from Hardman, Incorporated under the tradename "DPR");

Copolymers of acrylonitrile and butadiene, as available under the tradename "Hycar" from B. F. Goodrich and from Arco Chemical Company under the tradename "poly bd resins";

Copolymers of butadiene with isobutylene and isoprene, as by the depolymerization of butyl rubber or by copolymerization as reported in U.S. Pat. No. 3,562,804;

Conjugated diene butyl rubbers, available from Exxon;

1,2- and 1,4-polybutadienes having amino, carboxy, -COOR (in which R is lower alkyl), bromo, vinyl and hydroxy terminal groups;

EPT (ethylene propylene terpolymer) and Ethylene propylene diene low molecular weight rubbers; and copolymers of alpha olefins such as ethylene and propylene with unconjugated dienes such as cyclopentadiene, 2-methylene norborene and 11-ethyl-1,1,1-tri-decadiene.

The polymeric binders of the invention often are supplied in the form of aqueous emulsions, and reference is made to U.S. Pat. No. 3,099,650 as showing emulsion polymerization of butadiene polymers. Such emulsions typically have 40–50% polymer solids. As used in the invention, emulsions are typically treated to remove the aqueous vehicle before use. Water may be removed from an emulsion by rapidly agitating the emulsion in a Waring or other high-speed, blade-type mixer, the temperature of the polymer being raised typically to about 150° F. during the process.

The curing agent that is employed can be any of the curing agents commonly employed for curing the polymeric binder, such as sulfur, compounds that are sulfur donors, peroxides, etc. Examples of compounds that are sulfur donors are the alkylphenol disulfides (as sold under the tradename "Vultac" by Pennwalt Corporation) and 2-(hexamethyleniminothio)-benzothiazole and N-tert-butyl-2-benzothiazole sulfenamide, sold under the tradenames "Santocure 7" and "Santocure NS" by Monsanto. Other curing agents include dinitroso compounds such as p-dinitroso benzene, methylol phenolic resins, dibenzyl ether phenolic resins (with acid catalysis) and peroxides. Of significance, it has been found that far greater quantities of curing agents are required in the present invention than are normally required in the curing of the polymeric binders. For example, the curing agents referred to above are normally used in the curing of SBR rubber in an amount equal to about 2 percent up to about 10 percent by weight of the rubber. In the instant invention, the curing agent is employed in a quantity ranging from about 50 percent to about 500 percent by weight (depending upon the curing agent chosen) and preferably from about 100 to about 150 percent by weight, of the polymeric binder. If the curing agent is elemental sulfur, the curing agent and polymeric binder are employed preferably in approximately equal amounts by weight. If the curing agent is "Vultac 3", an alkylphenol disulfide sold by Pennwalt Corporation, then from about one and one-half to about three parts by weight of the curing agent are employed per part of the polymeric binder.

The composition of the invention may be produced by blending together in a suitable mixer such as a ribbon blender one hundred parts by weight of the cured rubber particles, from about 1 to about 5 pounds by weight, preferably about 2 to about 4 pounds by weight, of the polymeric binder and an effective amount (but not less than about 50 percent by weight and preferably at least about 100 percent by weight of the polymeric binder) of a curing agent such as sulfur. Blending is continued at elevated temperatures (e.g. about 100° F. to about 280° F. but preferably from about 140° F. to about 200° F.) until a substantially homogeneous, thorough mixture is obtained. Substantially all of the cured rubber particles are thus very lightly coated with the viscous polymeric binder and curing agent, but because of the relatively small amount of polymeric binder that is employed and the ability, as theorized, of the binder to absorb into the surface of the particles, the mixture is generally dry to the touch, is substantially free-flowing and can easily be poured into containers such as drums or plastic bags for later use. At room temperature, the composition ordinarily exhibits stability for extended periods of time.

The mixture thus produced may be charged to a compression mold which may, in one form, comprise a simple compression mold carried between a pair of heated press platens. The press is closed under pressure and is heated to a temperature sufficient to cause the polymeric binder to cure. Common curing temperatures range from about 280° F. to about 350° F. at molding pressures which may range up to 5000 psi or more. The pressure desirably is sufficiently high to eliminate substantially all air from the composition, and pressures common to the rubber molding industry are preferably used. However, the air that remains in the composition when low molding pressures are employed may provide a product with a desirable foamy, lofty, particulate structure useful, for example, as a sponge or heat insulation. The required molding time is a function of the speed with which heat energy can be transferred to the composition. For example, the molding time can be as short as two minutes if the thickness of the composition being molded is in the neighborhood of one-eigth inch, but fifteen minutes or more may be required in the event that the molding composition in the mold is two inches in thickness or greater. In general, physical properties are improved by utilizing higher temperatures and pressures and longer molding periods. The resulting product, when removed from the mold, exhibits physical properties approaching those of cured virgin rubber. When the product is made from fairly small rubber particles (20 mesh or finer in size), the individual rubber particles in the final product cannot be visually identified except under high magnification and the product appears uniform and resembles cured virgin rubber. Further, the compositions of the invention may be added to freshly compounded rubbers in significant quantities without great reduction in physical properties. The compositions may be used at concentrations ranging from small but commercially significant amounts (e.g., 25%) up to about 90% by weight of the filled rubber. Concentration ranges of from about 25% to about 75% are preferred, and the range of from about 30% to about 50% is most preferred.

Although I do not wish to be bound by the following explanation, I am of the opinion that the viscous polymeric binder actually penetrates into and solvates the surface of the rubber particles so that, upon subsequent heating under pressure, the curing of the polymeric binder knits together adjacent rubber particles into a strong, cohesive mass.

EXAMPLE NO. 1

A truck tire, having a high percentage of cured natural rubber was ground using known cryogenic pulverizing techniques to a particle size passing through a 30 mesh screen.

The polymeric binder was prepared from an emulsion of a styrene-1,4-butadiene copolymer sold under the tradename "FLOSTEX" by American Synthetic Rubber Company. The emulsion, at 40% solids, was dried by evaporation of the water vehicle. The remaining clear amber liquid exhibited a viscosity at 150° F. of 10,000 centipoises. The polymeric binder was reported to have 45% bound styrene.

Equal amounts by weight of the polymeric binder and elemental sulfur were gently mixed together to form a homogeneous suspension. Eight ounces of the mixed polymeric binder and sulfur were then added to 100 ounces of the ground rubber in a ribbon blender, and blending in the ribbon blender was continued for approximately 15 minutes. The resulting product was a black, pourable powder that was dry to the touch. Close visual examination of the product failed to reveal any free polymeric binder or sulfur.

The product was then charged into a rubber mold for molding a test specimen having a maximum thickness of approximately one-half inch, and the mold was heated at 310° F. for 30 minutes under a pressure of approximately 5000 psi. The pressure was sufficient to squeeze substantially all of the entrapped air from the product. Upon removal from the mold, the molded part was subjected to tensile and elongation tests in accordance with A.S.T.M. D-412. The tensile strength was found to be 1075 psi, and the elongation to break was 140%.

EXAMPLE NO. 2

Example No. 1 was repeated exactly except that the mold was placed only under light contact pressure. The resulting product, although exhibiting some strength and flexibility, was found to be a porous, open-celled, lightweight rubber product.

EXAMPLE NO. 3

Example No. 1 was repeated exactly, except that the polymeric binder and curing agent were replaced with 3 ounces of the polymeric binder, 2 ounces of sulfur, 1.25 ounces of N-tertbutyl-2-Benzothiazole sulfenamide (sold under the tradename "SANTOCURE NS") and 0.15 ounces of tetramethylthiuram disulfide (sold under the tradename "TMTD by RS Chemical Co."). The resulting product exhibited a tensile strength of approximately 816 psi, and an elongation to break of 125%. Whereas the hardness of the product prepared in Example No. 1 was approximately 63 (Shore "A"), the hardness of the product from the instant example was approximately 70 (Shore "A"). In the following examples, hardness is reported in "Shore A" units.

EXAMPLE NO. 4

Into 100 ounces of the ground rubber identified in Example No. 1 were blended 3 ounces each of sulfur and a polymeric binder. The polymeric binder was the same binder as was employed in Example No. 1, having 32 mole percent unsaturation. The resulting free-flowing composition was charged to the mold employed in Example No. 1 and was heated to 310° F. under common molding pressures for a period of 25 minutes. When removed from the mold, the product exhibited a tensile strength of 420 psi, an elongation to break of 120% and a hardness of 63.

EXAMPLE NO. 5

Example No. 4 was repeated exactly, except the cure time was increased to 40 minutes. The tensile strength of the resulting product was 620 psi, elongation to break was 120%, and the hardness was 63. By subsequently increasing the cure time to 60 minutes, the tensile strength was increased to 730 psi, the elongation to 135% and the hardness to 64.

EXAMPLE NO. 6

Example No. 5 was repeated exactly except that the polymeric binder was a copolymer of 1,4-butadiene and acrylonitrile sold by B. F. Goodrich & Company under the tradename "HYCAR 1312". The measured viscosity of the binder at 150° F. was 6720 centipoises. After curing for 30 minutes, the tensile strength of the molded product was found to be 450 psi, the elongation to break was 100%, and the hardness was 68.

EXAMPLE NO. 7

Example No. 6 was repeated exactly except that the polymeric binder that was employed was a 1,4-butadiene-styrene copolymer containing 25% bound styrene, having 63 mole percent unsaturation and having a viscosity at 150° F. of approximately 31,000 centipoises. The tensile strength of the resulting product was 511 psi, the elongation to break was 110%, and the hardness was 70.

EXAMPLE NO. 8

Example No. 7 was repeated exactly except that the polymeric binder was a 1,4-butadiene-styrene copolymer having 25% bound styrene and 68 mole percent unsaturation. This was a low molecular weight copolymer, and exhibited a viscosity at 150° F. of 1400 centipoises. The resulting molded product exhibited a tensile strength of 450 psi, an elongation to break of 100%, and a hardness of 68.

EXAMPLE NO. 9

Example No. 1 was repeated exactly, except that only two ounces of the polymeric binder and 2 ounces of the sulfur curing agent were employed. The resulting molded and cured product exhibited a tensile strength of 400 psi, an elongation to break of 80%, and a hardness of 62.

EXAMPLE NO. 10

Example No. 1 was repeated exactly except that only 1 ounce each of the polymeric binder and sulfur curing agent were employed. The resulting product exhibited a tensile strength of 490 psi, an elongation to break of 110% and a hardness of 58.

EXAMPLE NO. 11

Example No. 1 was repeated exactly except that the amount of sulfur that was employed was 2 ounces. The resulting product exhibited a tensile strength of 511 psi, an elongation to break of 105%, and a hardness of 65.

EXAMPLE NO. 12

Example No. 4 was repeated exactly, except that the polymeric binder that was employed was a hydroxy terminated 1,4-polybutadiene homopolymer sold under the tradename "Poly bd Liquid Resin" manufactured by Atlantic Richfield Company. The viscosity of the binder at 150° F. was 1000 cp. The resultant, molded product exhibited tensile, elongation and hardness properties substantially equivalent to those reported in Example No. 4.

EXAMPLE NO. 13

Example No. 4 was repeated exactly, except that the polymeric binder that was employed was a 1,4-butadiene-styrene copolymer (30% bound styrene) having a viscosity at 77° F. of 10,000 cp. The binder is a product sold under the tradename Ricon 181 by Colorado Specialties, Inc. The resultant product exhibited a tensile strength of 1000 psi, an elongation to break of 130%, and a hardness of 68.

EXAMPLE NO. 14

Example No. 4 was repeated exactly except the binder was primarily 1,2-polybutadiene (about 67% of the 1,2-structure) having a viscosity at 77° F. of 40,000 cp. The product is available from Colorado Specialties, Inc. under the tradename Ricon 151. The resultant molded product exhibited a tensile strength of 900 psi, an elongation to break of 110% and a hardness of 70. Use of a similar 1,2-polybutadiene having about 80% of the 1,2-structure (67,000 cp at 77°, sold as Ricon 153 by Colorado Chemical Specialties) yielded a product exhibiting 950 psi tensile, 120% elongation to break, and a hardness of 65.

EXAMPLE NO. 15-22

Example No. 4 was repeated exactly, except that the following polymeric binders were employed:

| Example No. | Copolymer |
|---|---|
| 16 | An amine terminated homopolymer of 1,4-polybutadiene having a viscosity at 81° F. of 225,000, sold under the tradename Hycar 1300X16 by B. F. Goodrich & Company. |
| 17 | An acid terminated 1,4-polybutadiene homopolymer having a viscosity at 81° F. of 265,000 centipoises, a product of B. F. Goodrich & Company and sold under the tradename Hycar CTBNX. |
| 18 | An hydroxy terminated polybutadiene-acrylontrile copolymer having a viscosity at 81° F. of 130,000 cp., a product of B. F. Goodrich & Company and sold under the tradename Hycar HTBN 1300X17. |
| 19 | A bromide-terminated 1,4-polybutadiene homopolymer sold as a dibromopolybutadiene by Polysar, Inc. The homopolymer exhibited a viscosity at 150° F. of 3000 centipoises. |
| 20 | A vinyl-terminated 1,4-polybutadiene homopolymer sold by B. F. Goodrich & Company under the tradename Hycar VTNBX 1300X19. The viscosity of the homopolymer at 81° F. was approximately 600,000 centipoises. |
| 21 | A depolymerized polyisoprene having a viscosity at 100° F. of 75,000 cp. (a product of Hardman Co.). |
| 22 | A depolymerized polyisoprene having a viscosity at 100° F. of 350,000 cp. (a product of Hardman Co.). |

The resultant products exhibited the following properties.

TABLE I

| Example No. | Tensile Strength psi | Elongation To Break, Percent | Shore "A" Hardness |
|---|---|---|---|
| 16 | 900 | 110 | 65 |
| 17 | 950 | 120 | 68 |
| 18 | 875 | 115 | 63 |
| 19 | 890 | 112 | 64 |
| 20 | 925 | 115 | 66 |
| 21 | 862 | 110 | 65 |
| 22 | 988 | 130 | 68 |

EXAMPLE NO. 23

Example No. 1 was repeated exactly except that the rubber particles were ground using a cryogenic process from a passenger car tire having a higher amount of SBR rubber as a constituent. The tensile strength, elongation to break and Shore "A" hardness were essentially the same as that reported in Example No. 1.

EXAMPLE NO. 24

Example No. 1 was repeated exactly except that the rubber tire particles were "skivings" taken from the tire retreading industry. The rubber particles were in the form of slices or slivers; that is, small, ribbon-like particles. The maximum length of the particles was approximately one inch. The molded, cured product exhibited the following properties:

| Tensile Strength: | 1100 psi |
|---|---|
| Elongation to break: | 120% |
| Hardness: | 70 |

EXAMPLE NO. 25

Example No. 4 was repeated exactly except that the rubber particles were of neoprene rubber. Properties of the molded product were:

| Tensile strength: | 875 psi |
|---|---|
| Elongation to break: | 120% |
| Hardness: | 75 |

The same experiment was performed with nitrile, EPDM and butyl rubbers, and the molded products were found to have the following properties:

| Particles | Tensile, psi | Elongation, % | Hardness |
|---|---|---|---|
| Nitrile Rubber | 900 | 130 | 70 |
| EPDM Rubber | 950 | 100 | 80 |
| Butyl Rubber | 750 | 100 | 60 |

EXAMPLE NO. 26

To demonstrate the utility of molding materials of the invention as extenders or fillers for rubber materials, the following compositions were prepared:

Rubber Recipe: The following ingredients, expressed in parts by weight, were thoroughly mixed in a Banbury mixer to provide a typical vulcanizable SBR rubber composition:

| | |
|---|---|
| 100 parts | SBR-1502, a standard SBR rubber manufactured by Goodyear and having a Mooney viscosity of 50 |
| 50 parts | zinc oxide |
| 1.5 parts | Stearic acid |
| 1.5 parts | Stabilizer (sold as "Agerite Stalite 'S'" by R. T. Vanderbilt Company, Inc.) |
| 120 parts | carbon black ("N660", a product of Ashland Chemical Company) |
| 40 parts | "Circosol 4240", a rubber processing oil sold by Sun Oil Company |
| 1.5 parts | Sulfur |
| 1.25 parts | "Santocure NS" (identified above) |
| 0.15 parts | TMTD (identified above) |

Tire Grind: Whole automobile tires were mechanically ground to a thirty mesh particle size.

Molding Materials: The following molding materials were prepared by uniform mixing of ingredients in a Banbury mixer:

| | |
|---|---|
| Material A | |
| 100 parts | Tire Grind |
| 3 parts | polymeric binder of Example 1 |
| 3 parts | Sulfur |
| Material B | |
| 100 parts | Tire Grind |
| 3 parts | polymeric binder of Example 1 |
| 2 parts | Sulfur |
| 1.25 parts | "Santocure NS", above identified |
| 0.15 parts | "TMTD", above identified |
| Material C | |
| 100 parts | Tire Grind |
| 3 parts | polymeric binder of Example 1 |
| 1.25 parts | "Santocure NS" |
| 0.15 parts | "TMTD" |
| Material D | |
| 100 parts | Tire Grind |
| 3 parts | polymeric binder of Example 1 |
| 1 part | Sulfur |
| 1.25 parts | "Santocure NS" |
| 0.15 parts | "TMTD" |

Molding compositions were prepared by uniformly mixing thirty parts by weight of each of Materials A–D with seventy parts by weight of the Rubber Recipe, and Compositions were molded as in Example 1. As a control utilizing untreated Tire Grind, a composition was made by mixing thirty parts of the Tire Grind into seventy parts of the Rubber Recipe. The following results were obtained:

TABLE II

| | Tensile, psi | Elongation, % |
|---|---|---|
| Rubber Recipe alone | 1700 | 380 |
| Rubber Recipe + Grind (Control) | 400 | — |
| Rubber Recipe + Material A | 1550 | 250 |
| Rubber Recipe + Material B | 1550 | 235 |
| Rubber Recipe + Material C | 1300 | 320 |
| Rubber Recipe + Material D | 1525 | 300 |

By increasing the parts by weight of Molding Materials A–D from 30 percent to 50 percent by weight of the compositions, molded products were produced exhibiting only slightly reduced values for tensile strength and ultimate elongation.

While a preferred embodiment of the present invention has been described, it should be understood that various changes, adaptations, and modifications may be made therein without departing from the spirit of the invention and the scope of the appended claims.

What is claimed is:

1. A substantially dry, particulate molding material comprising a uniform mixture of
    (a) 100 parts by weight of cured rubber particles;
    (b) from about 1 to about 5 parts by weight of liquid, sulfur-curable polymeric binder having ethylenic unsaturation and being soluble in hexane, benzene or a combination thereof, the binder having a viscosity at 280° F. of not greater than about one million centipoises and further characterized as being capable of softening surfaces of the cured rubber particles when applied thereto and the particles are heated; and
    (c) a curing agent for the polymeric binder in a quantity ranging from about 50% to about 500% by weight of the polymeric binder.

2. The composition of claim 1 in which the particle size of the cured rubber particles is finer than about 20 mesh.

3. The composition of claim 1 in which the curing agent comprises a sulfur donor for vulcanizing the polymeric binder in an amount ranging from about 0.5 to about 5 parts by weight per part by weight of the polymeric binder.

4. The composition of claim 1 in which the curing agent comprises elemental sulfur in an amount of from about 50% to about 150% by weight of the polymeric binder.

5. The composition of claim 3 in which the curing agent is a polysulfide.

6. The composition of claim 1 in which the polymeric binder comprises a copolymer of butadiene and ethylenically unsaturated monomer selected from the group consisting of styrene and acrylonitrile.

7. The composition of claim 1 wherein the polymeric binder comprises a homopolymer of butadiene.

8. A method of producing a rubber-like article comprising the steps of
(a) uniformly and thoroughly mixing together
   (i) 100 parts by weight of particulate, cured rubber;
   (ii) from about 1 to about 5 parts by weight of a liquid, sulfur-curable polymeric binder having ethylenic unsaturation and being soluble in hexane, benzene, or a combination thereof, the binder having a viscosity at 280° F. of not greater than about one million centipoises and further characterized of being capable as softening surfaces of the cured rubber particles when applied thereto and the particles are heated; and
   (iii) a curing agent for the polymeric binder in a quantity ranging from about 50% to about 500% by weight of the polymeric binder;
(b) charging the composition as a substantially dry, free-flowing, particulate mass, to a compression mold; and
(c) molding the composition under heat and pressure to form a solid, strong molded article.

9. A method of producing a rubber-like article comprising the steps of
(a) uniformly and thoroughly blending together
   (i) 100 parts by weight of particulate, cured rubber;
   (ii) from about 1 to about 5 parts by weight of a liquid, sulfur-curable polymeric binder having ethylenic unsaturation and being soluble in hexane, benzene or a combination thereof, the binder having a viscosity at 280° F. of not greater than about one million centipoises and further characterized as being capable of softening surfaces of the cured rubber particles when applied thereto and the particles are heated; and
   (iii) a curing agent for the polymeric binder in an amount not less than about 50% by weight of the polymeric binder, thereby providing a generally dry, particulate composition;
(b) Combining the particulate composition with uncured rubber, the resulting composition containing from about 25% to about 75% of the uncured rubber and from about 75% to about 25% of the particulate composition; and
(c) molding the resulting composition under heat and pressure to form a solid, strong molded article.

10. The method of claim 9 in which the polymeric binder and curing agent are first mixed together and are then blended with the particulate cured rubber.

11. The method of claim 9 in which the molding pressure is sufficient to substantially eliminate air from the composition.

12. The method of claim 9 in which the molding pressure is insufficient to substantially eliminate air from the composition.

13. The molded product resulting from the method of claim 9.

14. A molding composition comprising a uniform blend of uncured rubber with the molding material of claim 1.

15. The molding composition of claim 14 in which the concentration of the molding material is in the range of from about 25% to about 90% by weight.

16. A molding composition comprising a uniform blend of from about 75% to about 25% by weight of an uncured rubber, and about 25% to about 75% by weight of a filler material comprising
(a) 100 parts by weight of cured rubber particles;
(b) from about 1 to about 5 parts by weight of a liquid, sulfur-curable polymeric binder having ethylenic unsaturation and being soluble in hexane, benzene, or a combination thereof, the binder having a viscosity at 280° F. of not greater than about one million centipoises and further characterized as being capable of softening surfaces of the cured rubber particles when applied thereto and the particles are heated; and
(c) A curing agent for the polymeric binder in a quantity ranging from about 50% to about 500% by weight of the polymeric binder.

17. A molding composition comprising a uniform blend of from about 75% to about 25% by weight of an uncured rubber, and about 25% to about 75% by weight of a filler material comprising
(a) 100 parts by weight of cured rubber particles;
(b) from about 1 to about 5 parts by weight of a liquid, sulfur-curable polymeric binder having ethylenic unsaturation and being soluble in hexane, benzene or a combination thereof, the binder having a viscosity at 280° F. of not greater than about one million centipoises and further characterized by being capable of softening surfaces of the cured rubber particles when applied thereto and the particles are heated; and
(c) a curing agent for the polymeric binder in a quantity of not less than about 50% by weight of the polymeric binder.

18. The molding composition of claim 17 wherein said cured rubber particles are selected from the group consisting of styrene-butadiene rubbers, neoprene rubbers, nitrile rubbers, butyl rubbers and ethylene propylene-diene rubbers.

* * * * *